(12) United States Patent
Matsuura

(10) Patent No.: US 6,246,530 B1
(45) Date of Patent: Jun. 12, 2001

(54) LENS ASSEMBLY AND APPARATUS USING THE SAME

(75) Inventor: Michio Matsuura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/418,868

(22) Filed: Oct. 15, 1999

(30) Foreign Application Priority Data

Jan. 29, 1999 (JP) ................................................ 11-023011

(51) Int. Cl.[7] ........................................................ G02B 3/02
(52) U.S. Cl. ............................ 359/719; 359/626; 359/622; 219/121.77
(58) Field of Search ...................................... 359/719, 619, 359/625, 626, 622, 784, 793; 219/121.77; 369/44.17

(56) References Cited

U.S. PATENT DOCUMENTS

| | | | |
|---|---|---|---|
| 5,055,653 | * 10/1991 | Funami et al. | 219/121.75 |
| 5,526,182 | * 6/1996 | Jewell et al. | 359/621 |
| 5,923,475 | * 7/1999 | Kurtz et al. | 359/619 |

FOREIGN PATENT DOCUMENTS

| | | |
|---|---|---|
| 8221790 | 8/1996 | (JP) . |
| 9161304 | 6/1997 | (JP) . |
| 10092002 | 4/1998 | (JP) . |
| 10124943 | 5/1998 | (JP) . |

* cited by examiner

*Primary Examiner*—Georgia Epps
*Assistant Examiner*—Tim Thompson
(74) *Attorney, Agent, or Firm*—Greer, Burns & Crain, Ltd.

(57) ABSTRACT

A lens assembly is provided for causing a laser beam to form a focal spot in a recording region of an optical recording medium including a substrate. The lens assembly includes a plurality of focusing lenses each including an incidence surface for receiving the laser beam and an emitting surface for emitting the laser beam. Each focusing lens is arranged so that the emitted laser beam is caused to converge at a first focus located in contact with the substrate of the optical recording medium. The focusing lens is also arranged so that light sent from the first focus is caused to converge at a second focus located in the recording region of the optical recording medium to form the focal spot.

17 Claims, 13 Drawing Sheets

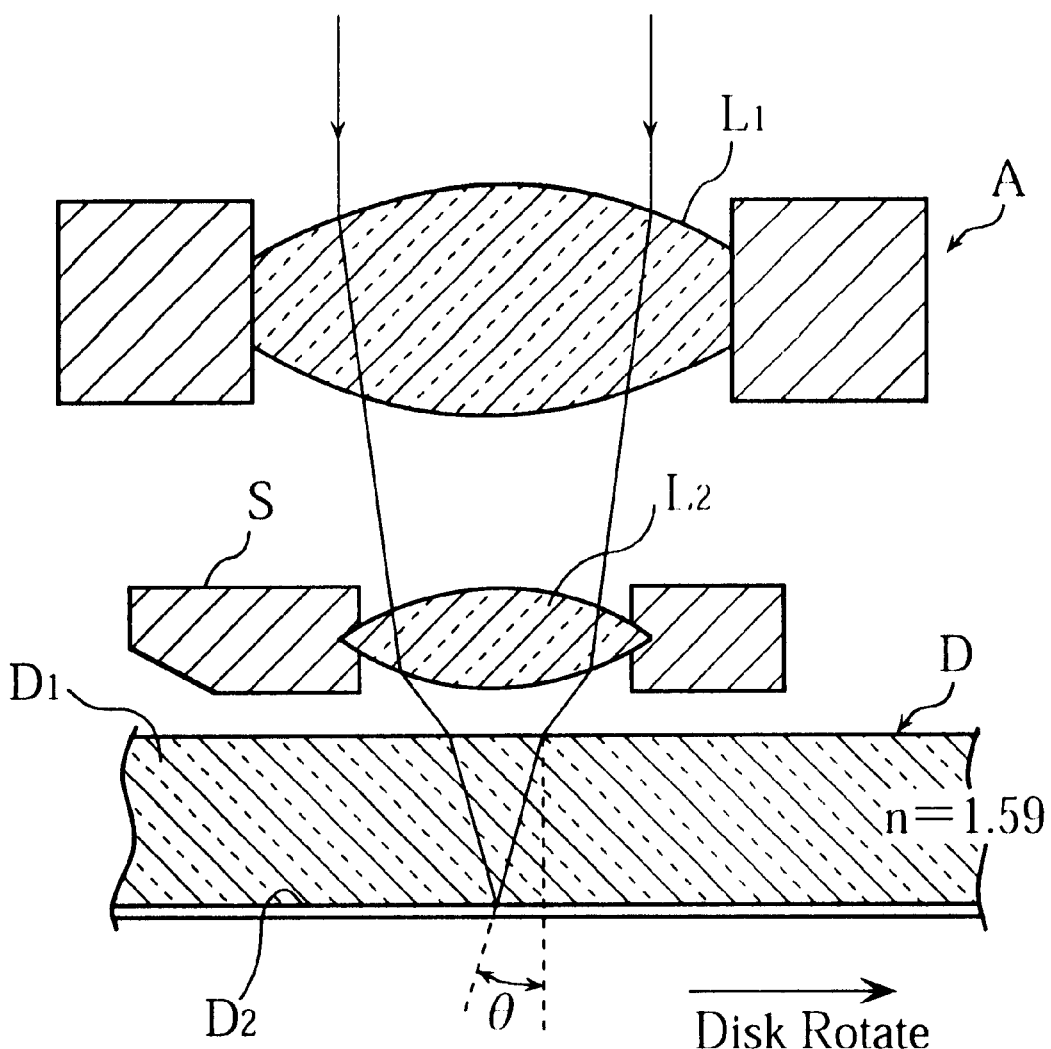

LENS ASSEMBLY AND APPARATUS USING THE SAME

BACKGROUND OF THE INVENTION

1. Field of the Invention

The present invention relates to a lens assembly used for an optical recording apparatus. The present invention also relates to an optical head and an optical disk apparatus which incorporate such a lens assembly. In this specification, the "optical disk apparatus" refers not only to an apparatus used strictly for reading data from an optical disk, but also to a magneto-optical disk apparatus capable of both reading and writing data with respect to a magneto-optical disk by magnetic field modulation or optical pulse modulation. The phrase "optical disk apparatus" further refers to other kinds of optical disk apparatus.

2. Description of the Related Art

Generally, in an optical disk apparatus of the above type, the data storage capacity of an optical disk is in inverse proportion to the square of the diameter of a focal spot to be formed on the recording region of the disk. Thus, to increase the storage capacity of the disk, it is desirable to reduce the diameter of the focal spot as much as possible. As is known, the diameter of the focal spot is proportional to "$\lambda$ (wavelength of laser beam) divided by NA (numerical aperture)." Thus, theoretically, there are two possible ways to reduce the diameter of the focal spot, that is, to reduce $\lambda$ or to increase NA. However, due to certain limitations concerning the properties of materials, it is rather difficult to obtain a semiconductor laser capable of emitting light whose wavelength is sufficiently small. Thus, for the present, it is impossible to obtain an inexpensive, short-wavelength laser (blue laser) which is satisfactory in terms of output and lifetime. Under these circumstances, the second option (i.e., to increase NA) may inevitably be employed to reduce the diameter of the focal spot, and new techniques to achieve a smaller diameter have been eagerly sought after.

In this connection, reference is now made to FIG. 17 showing a conventional arrangement adopted for obtaining an increased NA (see JP-A-8-221790). In the illustrated conventional device, use is made of a lens assembly including two objective lenses, that is, a first objective lens $L_1$ mounted on a lens actuator A and a second objective lens $L_2$ mounted on a slider S which in turn is supported by a carriage. The second objective lens $L_2$ is arranged adjacent to the surface of a transparent disk substrate $D_1$ of an optical disk D. With such an arrangement, the overall NA of the lens assembly can be made greater than when only a single objective lens is used.

Though the overall NA is increased to a certain extent, the above conventional arrangement is disadvantageous in the following point. As stated above, the second objective lens $L_2$ is arranged adjacent to (but, outside of) the transparent substrate $D_1$ of the disk D, and this lens (together with the first objective lens $L_1$) causes the laser beam to converge at a point in the recording region $D_2$ of the disk D. With such an arrangement, the NA, which can be expressed by "n (refractive index of the transparent substrate $D_1$)×sin $\theta$" as shown in FIG. 17, cannot be made greater than 1. Practically, the NA is about 0.8 at most.

The improvement of the data storage capacity of a magneto-optical disk may be achieved by another method disclosed in JP-A-10-124943 for example. According to this conventional method, part of the focal spot of the laser beam is magnetically masked by utilizing the fact that magnetic layers laminated on a recording layer of the disk have different Curie temperatures.

In the above method, the diameter of the focal spot itself is not reduced. Thus, the problem of crosstalk between adjacent tracks may still be incurred, which is a hindrance to the improvement of the data storage capacity of the disk.

SUMMARY OF THE INVENTION

The present invention has been proposed under the above circumstances, and one of its objective is to provide a lens assembly whose theoretical numerical aperture is suitably increased for reducing the diameter of the focal spot of a laser beam.

Another objective is to provide an optical head incorporating such a lens assembly.

Still another objective is to provide an optical disk apparatus incorporating such an optical head, whereby the data storage capacity of the disk apparatus is remarkably increased.

For attaining the above objectives, the following technical measures are taken in the present invention.

According to a first aspect of the present invention, there is provided a lens assembly for causing a laser beam to form a focal spot in a recording region of an optical recording medium including a substrate, the lens assembly comprising:

a plurality of focusing lenses each including an incidence surface for receiving the laser beam and an emitting surface for emitting the laser beam;

wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

In a preferred embodiment, each focusing lens has a length defined between its incidence surface and its emitting surface. The length of each focusing lens is determined in correspondence to an optical length of a first light path extending from the first focus relating to said each focusing lens to the second focus.

In the preferred embodiment, a second light path is defined as one extending from the incidence surface of each focusing lens to the second focus and has an optical length. The optical lengths of the second light paths relating to the respective focusing lenses are equal to each other.

In another preferred embodiment, a second light path is defined as one extending from the incidence surface of each focusing lens to the second focus and has an optical length. The optical lengths of the second light paths relating to the respective focusing lenses are made different from each other by a multiple of a wavelength of the laser beam. Here, the multiple includes zero.

Preferably, each of the focusing lenses may comprise a rod lens having a flat incidence surface and a convex emitting surface, wherein diameters of the respective rod lenses are made equal to each other.

In a preferred embodiment, at least one of the focusing lenses may be held in contact with four others of the focusing lenses, so that the focusing lenses are arranged in a lattice-like pattern. Alternatively, at least one of the focusing lenses may be held in contact with six others of the focusing lenses, so that the focusing lenses are arranged in a honeycomb-like pattern.

In a preferred embodiment, the focusing lenses may comprise concentric ring-shaped lenses each having a flat incidence surface and a convex emitting surface.

According to a second aspect of the present invention, there is provided a lens assembly for causing a laser beam to form a focal spot in a recording region of an optical recording medium including a transparent substrate, the lens assembly comprising:

a plurality of focusing lenses each including an incidence surface for receiving the laser beam and an emitting surface for emitting the laser beam; and a plurality of solid immersion lenses each of which is arranged adjacent to the emitting surface of a respective one of the focusing lenses and has an emitting surface;

wherein a combination of said each solid immersion lens and the respective one of the focusing lenses is arranged so that the laser beam is caused to converge at a first focus located adjacent to an emitting surface of said each solid immersion lens, the combination being also arranged so that light sent from a near-field light at the first focus is caused to converge at a second focus located in the recording region of the optical recording medium to form the focal spot.

Preferably, a light path is defined as one extending from the incidence surface of each focusing lens to the second focus and has an optical length. The optical lengths of the light paths relating to the respective focusing lenses may be made different from each other by a multiple of a wavelength of the laser beam. Here, the multiple includes zero.

Each of the focusing lenses may comprise a rod lens having a flat incidence surface and a convex emitting surface, wherein diameters of the respective rod lenses are made equal to each other.

According to a third aspect of the present invention, there is provided an optical head comprising:

a lens assembly for causing a laser beam to form a focal spot in a recording region of an optical recording medium including a substrate, the lens assembly being provided with a plurality of focusing lenses each including an incidence surface for receiving the laser beam and an emitting surface for emitting the laser beam; and a slider carrying the lens assembly and movable along the substrate of the optical recording medium;

wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

Preferably, the above optical head may further comprise an actuator mounted on the slider for moving the lens assembly toward and away from the optical recording medium.

Advantageously, the optical head may further comprise a liquid crystal panel arranged on a side of the incidence surfaces of the focusing lenses, wherein the liquid crystal panel is divided into sections corresponding to the focusing lenses, respectively. Each of the sections of the liquid crystal panel is arranged to have a variable refractive index.

According to a fourth aspect of the present invention, there is provided a lens assembly comprising:

a plurality of light-focusing rod lenses each having an incidence surface for receiving light and an emitting surface for emitting the light, the emitting surfaces of the respective rod lenses being arranged in a common plane, each of the rod lenses having a length defined between its incidence surface and emitting surface; and a holder for holding the rod lenses together;

wherein the length of an outer rod lens is smaller than that of an inner rod lens, the rod lenses being arranged to cause light to converge at first focuses located within an optical member having a high refractive index, the rod lenses being also arranged to cause light sent from the first focuses to converge at a common second focus.

According to another aspect of the present invention, there is provided an optical disk apparatus comprising:

a lens assembly for causing a laser beam to form a focal spot in a recording region of an optical recording medium including a substrate, the lens assembly including a plurality of focusing lenses each of which is provided with an incidence surface for receiving the laser beam and an emitting surface for emitting the laser beam; and a supporting member for supporting the lens assembly;

wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

According to still another aspect of the present invention, there is provided an optical disk apparatus comprising:

a lens assembly for causing a laser beam to form a focal spot in a recording region of an optical recording medium including a substrate, the lens assembly being provided with a plurality of focusing lenses each including an incidence surface for receiving the laser beam and an emitting surface for emitting the laser beam;

a slider carrying the lens assembly and movable along the substrate of the optical recording medium; and an actuator mounted on the slider for moving the lens assembly toward and away from the optical recording medium;

wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

Other objects, features and advantages of the present invention will become clearer from the following detailed description given with reference to the accompanying drawings.

BRIEF DESCRIPTION OF THE DRAWINGS

In the accompanying drawings:

FIG. 17 is a sectional side view showing principal portions of a conventional optical disk apparatus.

DETAILED DESCRIPTION OF THE PREFERRED EMBODIMENTS

The preferred embodiments of the present invention will be described below with reference to the accompanying drawings.

Figure 1:
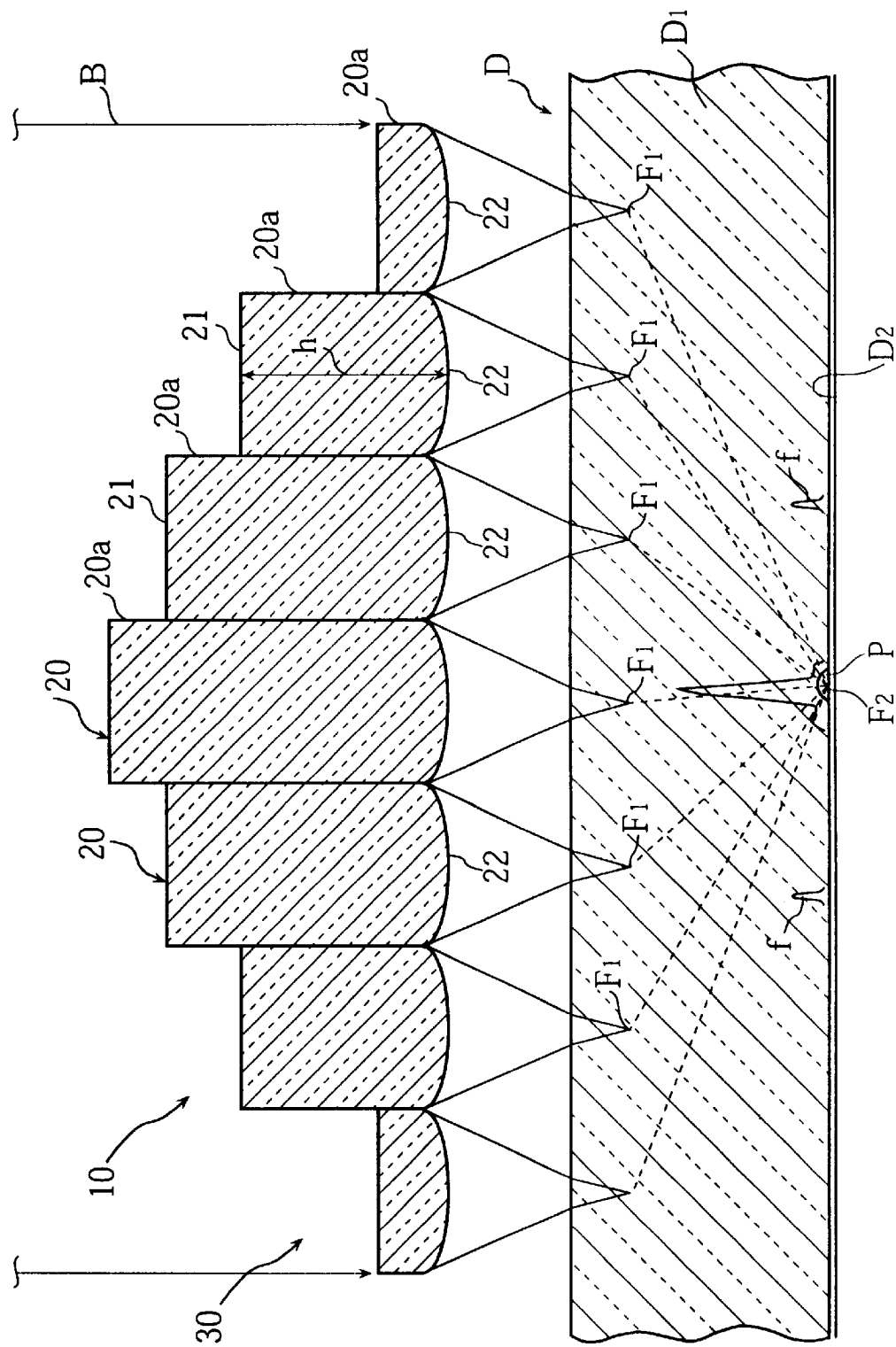
FIG. 1 is a sectional view schematically showing a first example of lens assembly provided according to a first aspect of the present invention.
Figure 2:
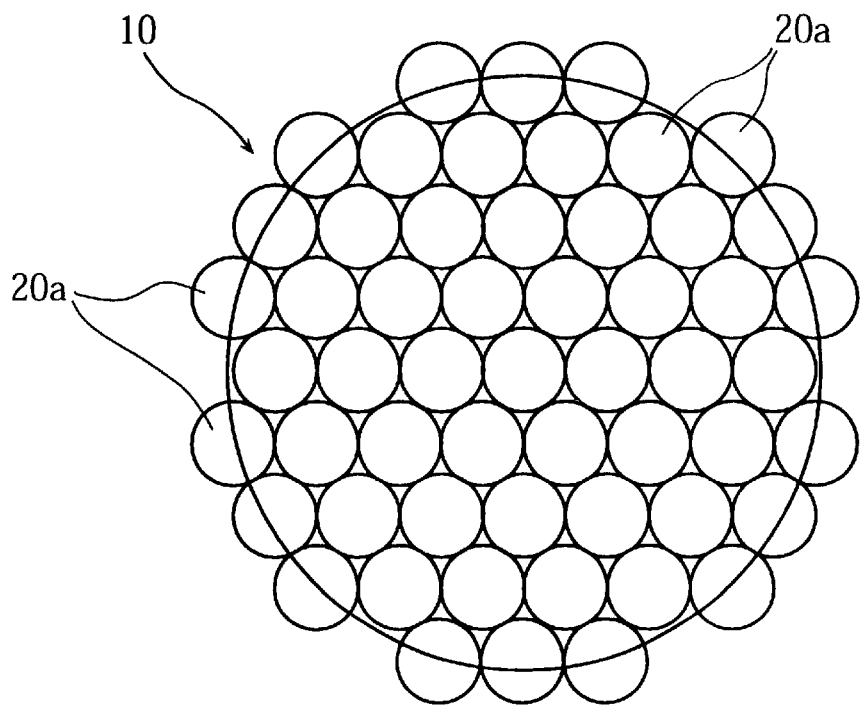
FIG. 2 is a plan view showing an arrangement of rod lenses used for the lens assembly shown in FIG. 1.

According to a first aspect of the present invention, various kinds of lens assemblies are provided. FIG. 1 of the accompanying drawings shows a lens assembly according to a first embodiment of the present invention. The illustrated lens assembly, which is generally indicated by reference numeral 1, includes a plurality of converging lenses 20 which may be made of a transparent resin material such as PMMA (polymethyl methacrylate). In this embodiment, each converging lens 20 is a cylindrical rod lens 20a having a predetermined diameter. Preferably, as shown in FIG. 2, the rod lenses 20a are arranged in two dimensions, with any inner rod lens 20a being held in close contact with six other rod lenses 20a via its side surface. Thus, the configuration resembles a honeycomb. The rod lenses 20a are held together by being inserted into a transparent resin body (not shown) which may be formed as a slider for example. In use, the lens assembly 30 is arranged at a predetermined distance relative to an optical disk D (an example of optical recording medium), with its light-emitting side held in facing relation to a transparent substrate D1 of the optical disk D.

The transparent substrate D1 of the optical disk D may be made of a suitable resin material and has a predetermined thickness. The rear side (or lower side, in FIG. 1) of the substrate D1 is provided with a recording region D2.

As shown in FIG. 1, each rod lens 20a has a flat incidence surface 21 and a convex light-emitting surface 22. The light-emitting surface 22 has an aspherical configuration so that parallel laser beam B incident upon the incidence surface 21 will be caused to converge on a first focus F1 properly (without suffering aberration for example). The first focus F1 may be located on the surface of the disk substrate D1 or inside of the disk substrate.

Each rod lens 20a has a length h (defined as the distance between the incidence surface 21 and the light-emitting surface 22). The lengths h of the respective rod lenses 20a may be made different, depending upon how far the rod lenses 20a are spaced from the center of the lens assembly 30. In the illustrated embodiment, the length h of each rod lens 20a is rendered to become smaller as the rod lens 20a is farther away from the center of the lens assembly 30. As a result, the incidence surface 21 of an outer rod lens 20a is disposed lower than the incidence surfaces 21 of any other inner rod lenses 20a (note that the light-emitting surfaces 22 of the respective rod lenses 20a are put at the same elevation or in the same plane). In this manner, the incidence surfaces 21 of inner and outer rod lenses 20a are displaced relative to each other in the direction of the optical axis of the lens assembly 10.

The difference in height between the incidence surface 21 of an inner rod lens 20a and that of an outer rod lens 20a is equal to a multiple of $\lambda$, where "$\lambda$" is the wavelength of the laser beam. With such an arrangement, the incidence surface 21 of each rod lens 20a can be put at a position corresponding to the wave front of the laser beam B.

As can be seen from FIG. 1, laser beam B incident upon any one of the rod lenses 20a travels along a path which extends from the incidence surface 21 of the relevant rod lens 20a to a predetermined point F2 (referred to as the "second focus" below) via the light-emitting surface 22 and the first focus F1. The second focus F2 is disposed within the disk substrate D1, preferably in the recording region D2.

As described above, the lengths h of the respective rod lenses 20a are made smaller as proceeding radially outward from the center of the lens assembly 10. Thus, the optical lengths (i.e., the lengths taking into account the refractive indices of the disk substrate and others) of the light paths relating to the respective rod lenses 20a may be equalized, or alternatively, the optical lengths of the light paths may be arranged to differ such that their differences are equal to a multiple of $\lambda$, where "$\lambda$" is the wavelength of the laser beam.

In use, due to the above-described rod lenses 20a, the laser beam B incident upon the lens assembly 10 is caused to converge at the respective first focuses F1 located within the disk substrate D1. After converging at the first focuses F1, the laser beam will behave as if it is emitted from light sources positioned at the first focuses F1, respectively. Then, the light sent out from the first focuses F1 will converge at a certain position (or the second focus F2) on the recording region of the disk D, at which the luminosity becomes maximum. The second focus F2 is used as an ideal focal spot P for performing writing and/or reading data with respect to the recording region D2 of the optical disk D.

As stated above, before led to the second focus F2, the laser beam B is caused to converge at the first focuses F1 which are located within the disk substrate D1 whose refractive index is relatively high. This arrangement makes it possible to obtain a numerical aperture of no less than 1. With such a great numerical aperture, it is possible to remarkably reduce the diameter of the final light spot generated in the lens assembly 10. In this regard, it should be noted that the numerical aperture of each rod lens 20a may be rather small, since the rod lens 20a is provided only for causing the laser beam B to converge at the first focus F1 within the disk substrate D1. In view of this, the rod lenses 20a can be properly produced without wave aberration nor coma aberration being introduced.

Figure 3:
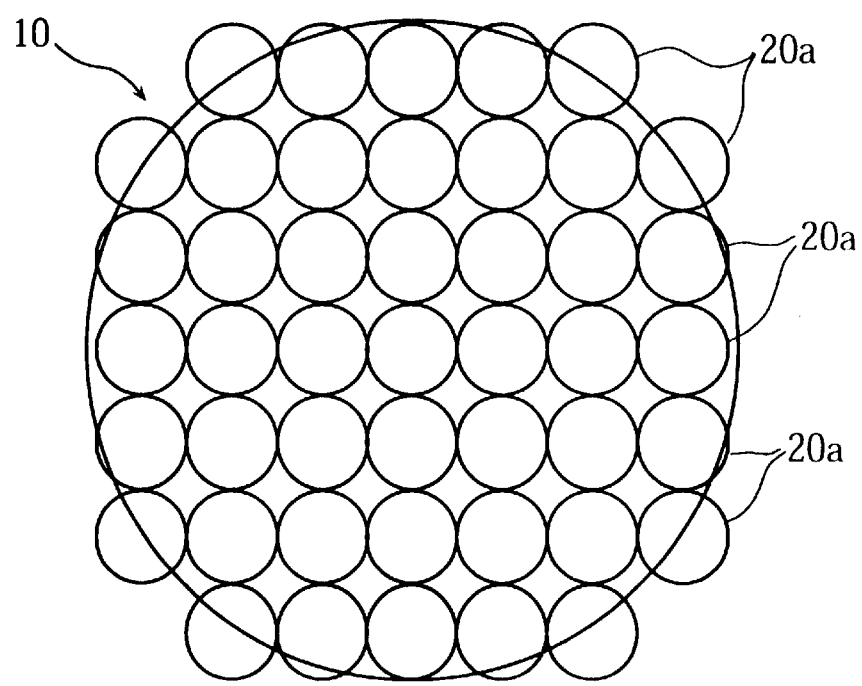
FIG. 3 is a plan view showing another arrangement of the rod lenses used for the lens assembly shown in FIG. 1.

In the lens assembly 10 having the above arrangement, the respective first focuses f1 function as discrete point-source lights due to the use of the rod lenses 20a. As a result, some spurious focuses f may appear at certain intervals radially of the second focus F2. Since such spurious focuses f are one of the causes which may give rise to noise in readout signals, it is desirable to reduce the occurrence of the spurious focuses f to the minimum. In this connection, it has been found that the prevention can be achieved more reliably when the lens assembly 10 includes a greater number of rod lenses 20a in a limited space. In this context, the honeycomb arrangement shown in FIG. 2 is preferable to a relatively sparse rod lens arrangement as shown in FIG. 3. Further, ideally the diameter of each rod lens 20a may be reduced for packing a greater number of rod lenses 20a into the limited space.

Figure 4:
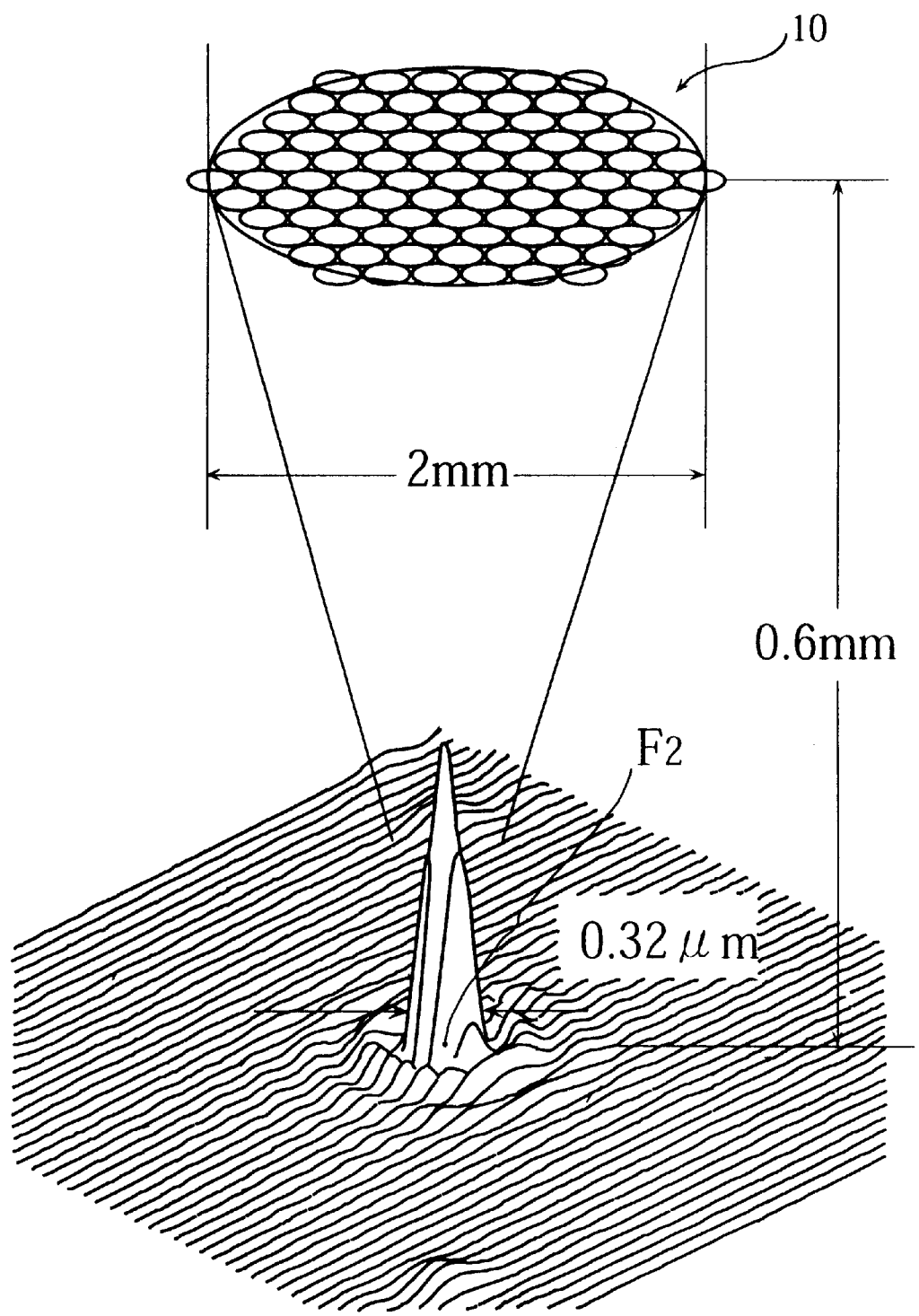
FIG. 4 is a simulation diagram showing a second focus generated by a lens assembly of the present invention.

FIG. 4 is a three-dimensional simulation diagram illustrating luminosity at and around the focal spot P (see also FIG. 1). In this diagram, the extent of the upward undulations represents the magnitude of the luminosity. As seen from the diagram, the luminosity becomes the greatest at the second focus F2. This simulation adopted the following conditions: 0.2 mm for the diameter of each rod lens; 2 mm for the overall diameter of the lens assembly 10; 0.6 mm for the thickness of the disk substrate (whose refractive index is 1.59); and 640 nm for the wavelength of the laser beam. The numerical aperture worked out by this simulation is 1.36, which is greater than 1. Thus, the diameter of the focal spot (that is, the diameter measured where the intensity of the focused light is equal to $1/e^2$ of the peak intensity, where "e" is the base of the natural logarithm) obtained in the above simulation is 0.32 $\mu$m (the theoretical diameter is 0.39 $\mu$m). It should be noted that the conventionally attainable diameter of the focal spot is 0.8–0.9 $\mu$m, which is more than twice the result obtained by the above simulation. This means that with the use of the lens assembly 10 of the present invention, it is possible to write or read data along a track of an optical disk even when the density of the data is greater (twice or more) than a conventional standard density. In addition, when the pitch of the adjacent tracks is made smaller (half or less) than a conventional standard pitch, the storage capacity of an optical disk can be greater (at least four times) than a conventional capacity.

Figure 5:
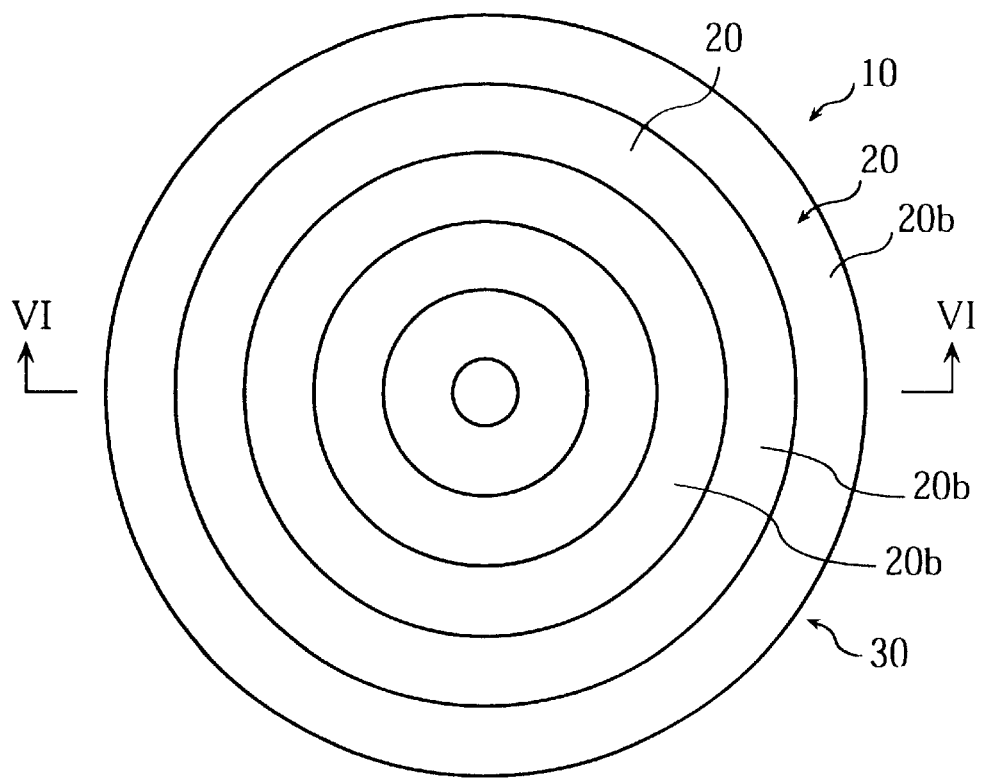
FIG. 5 is a plan view showing a second example of lens assembly provided according to the first aspect of the present invention.
Figure 6:
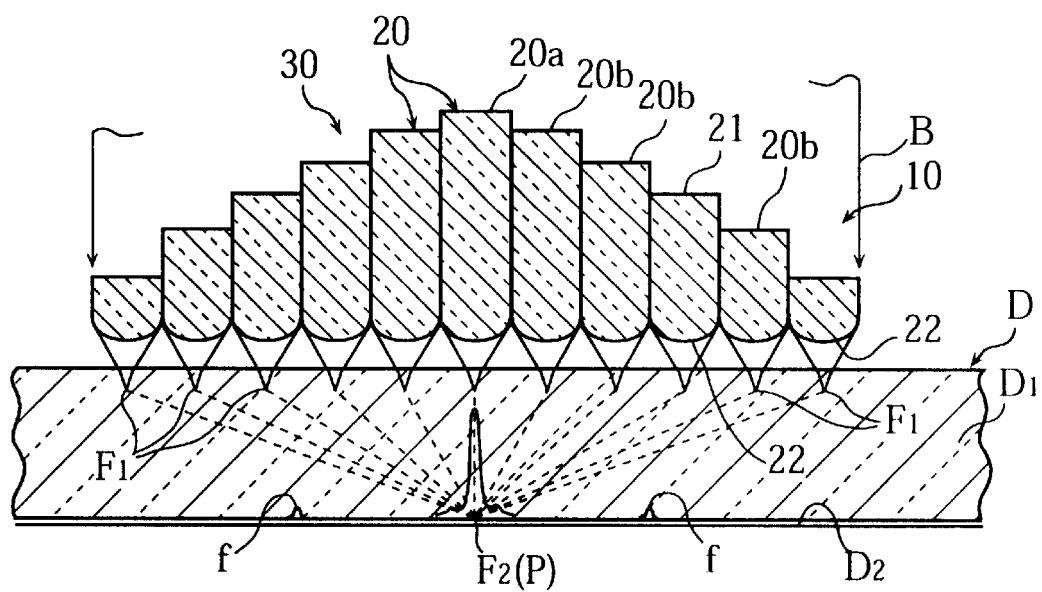
FIG. 6 is a sectional view taken along lines VI—VI in FIG. 5.

FIGS. 5 and 6 schematically show a lens assembly according to a second embodiment of the present invention. In this embodiment again, use is made of a plurality of focusing lenses 20 for converging laser beam. The central focusing lens is a rod lens 20a having a flat incidence surface and a convex light-emitting surface, whereas the other focusing lenses are circular, ring-shaped lenses 20b concentrically surrounding the central rod lens 20a. As viewed in a vertical section (FIG. 6), each ring-shaped lens 20b is also provided with a flat incidence surface 21 and a convex light-emitting surface 22. Thus, in the vertical section, the lens assemblies of the first and second examples give an essentially similar appearance.

The above similarity between the first and the second examples means that they can perform the same functions. Thus, with the use of the lens assembly 10 of the second example, parallel laser beam B incident upon the lens assembly 10 is caused to converge at first focuses F1 which may be located on the surface of the transparent disk substrate D1 or within the same disk substrate. Other features described in connection with the first example (such as the positional relation among the incidence surfaces 21 and the relation among the optical lengths of the light paths) are also applicable to the lens assembly 10 of the second example.

Thus, in this example again, laser beam sent out from the first focuses F1 will converge on a second focus F2 located on the recording region of the disk D to provide a focal spot P (see FIG. 6). It should be noted that each first focus F1 of the second example is not a point but a continuous circular line, as opposed to that of the first example. Thus, according to the second embodiment, it is possible to reduce the occurrence of spurious focuses f.

Figure 7:
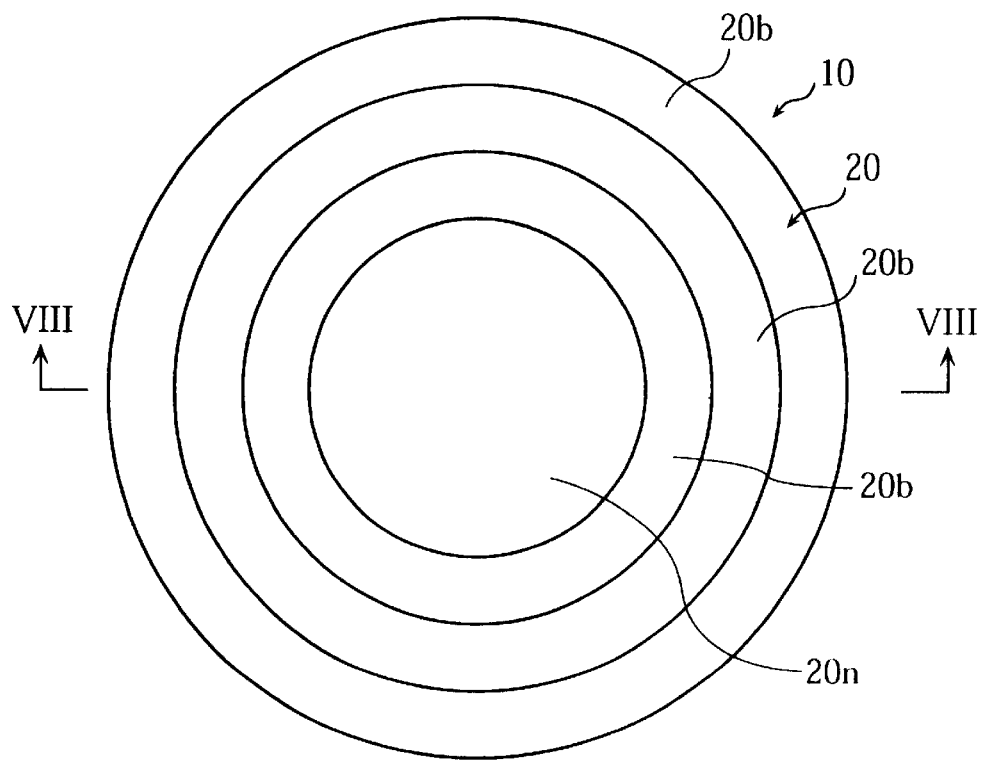
FIG. 7 is a plan view showing a third example of lens assembly provided according to the first aspect of the present invention.
Figure 8:
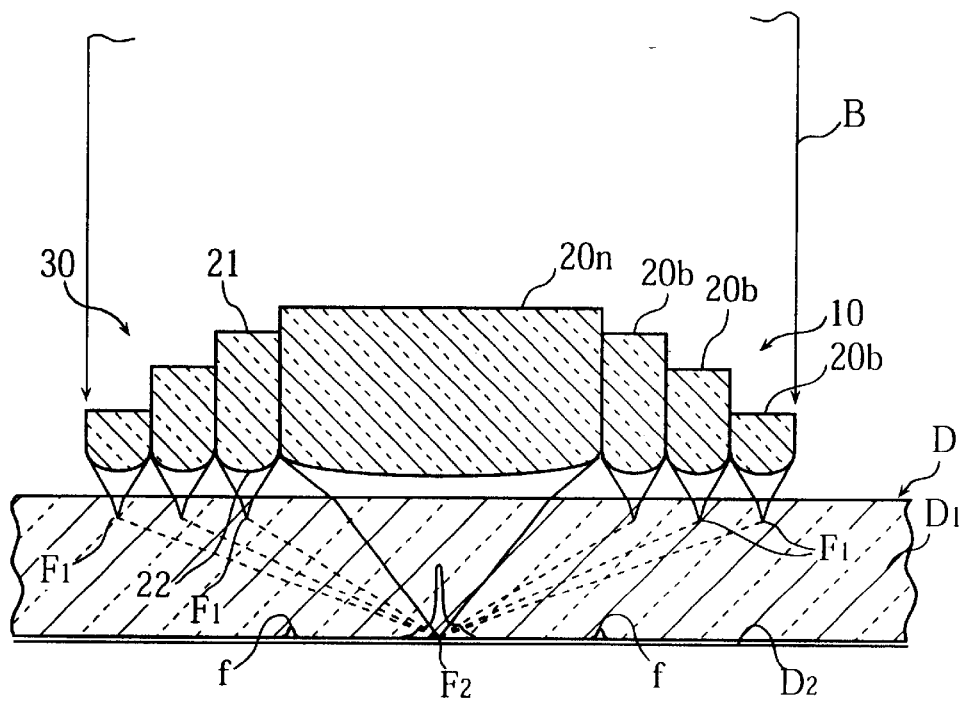
FIG. 8 is a sectional view taken along lines VIII—VIII in FIG. 7.

FIGS. 7 and 8 show a lens assembly (indicated by reference numeral 10) according to a third embodiment of the present invention. The lens assembly 10 of this embodiment includes an ordinary lens 20n arranged at the center and a plurality of concentric ring-shaped lenses 20b surrounding the central lens 20n. The function of the illustrated ring-shaped lenses 20b is the same as that of the counterparts of the second embodiment. As shown schematically in FIG. 8, the light focused by the central lens 20n is superimposed on other light focused by the ring-shaped lenses 20b. As a result, the luminosity is sharply increased at the second focus F2, which implies a reduced diameter of the focal spot P. Thus, high-density data reading and/or writing can be performed.

Figure 9:
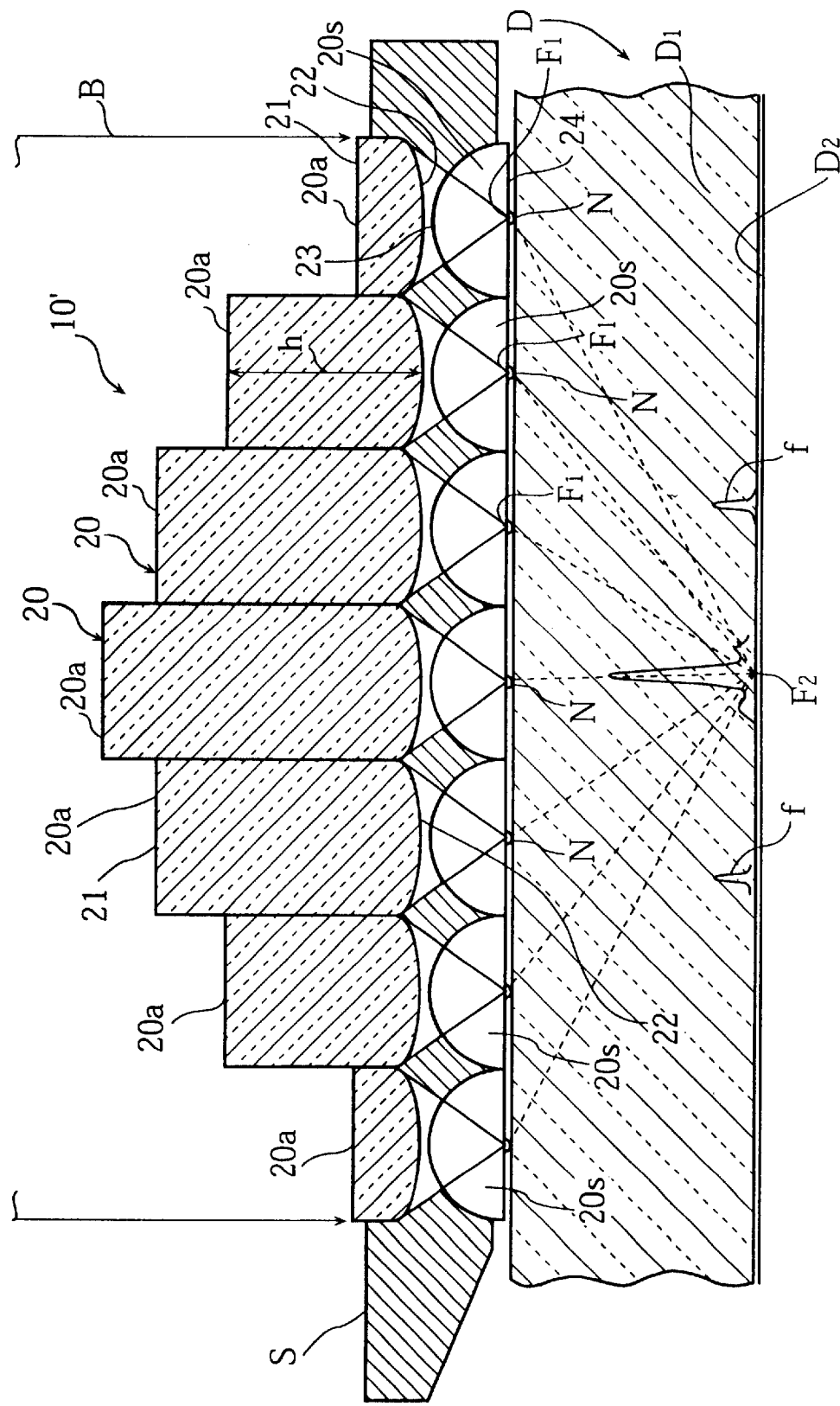
FIG. 9 is a sectional view schematically showing an example of lens assembly provided according to a second aspect of the present invention.

According to a second aspect of the present invention, other kinds of lens assemblies are provided. FIG. 9 shows a preferred embodiment of such lens assemblies. The illustrated lens assembly 10' includes a plurality of rod lenses 20a, as in the lens assembly 10 shown in FIG. 1. The lens assembly 10' also includes a plurality of solid immersion lenses 20s which correspond in number to the rod lenses 20a. Each immersion lens 20s is arranged in facing relation to the light-emitting surface of a corresponding one of the rod lenses 20a.

The rod lenses 20a and the immersion lenses 20s are held together by a supporting member S made of resin for example. In the illustrated embodiment, the supporting member S is a slider. As viewed from below (or from above), the rod lenses 20a and the immersion lenses 20s appear to be a honeycomb (see FIG. 2). The incidence surface 21 of each rod lens 20a is so arranged as to correspond in position to a wave front of the laser beam B. The solid immersion lenses 20s may be made of a material having a high refractive index, as disclosed at pages 99–101 of the 691st issue of "Nikkei Electronics" published in Jun. 1997.

Typically, each immersion lens 20s includes a spherical or aspherical incidence surface 23 and a flat light-emitting surface 24. Each rod lens 20b and the corresponding immersion lens 20s work together for causing the incident laser beam to converge at a first focus F1 without any aberration being introduced. The first focus F1 may be located at the light-emitting surface 24 of the immersion lens 20s or within the body of the immersion lens 20s near the light-emitting surface 24.

In the neighborhood of the first focus F1 is generated the so-called near-field light N. In the present embodiment, since the first focus F1 is located within a substance whose refractive index is greater than 1, the diameter of the light spot formed at the first focus F1 is rendered to be sufficiently small. Thus, each near-field light N can be regarded as a diametrically small light source.

When the length h of each rod lens 20 and the distance to the disk D are properly adjusted, light emitted from the near-field lights N will be properly focused (i.e., the luminosity becomes maximum) at the second focus F2 located at the recording region D2 of the disk D. As a result, the focal spot at the second focus F2 is advantageously used for reading and/or writing data with respect to the recording region D2 of the optical disk D.

Figure 10:
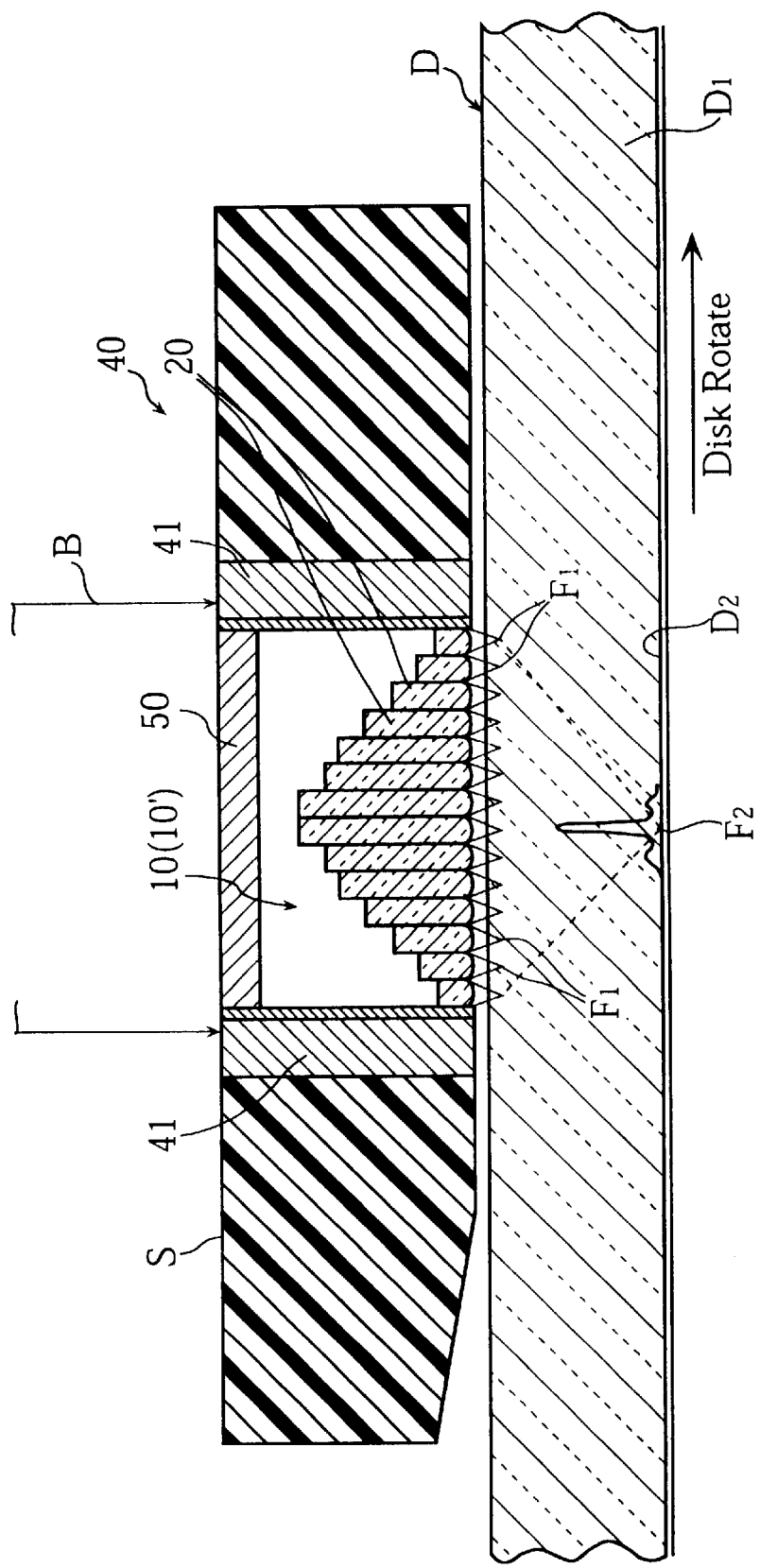
FIG. 10 is a sectional view schematically showing an example of optical head provided according to a third aspect of the present invention.

In the above embodiment again, the optical lengths of the light paths (extending from the incidence surface 21 of each rod lens 20b to the second focus F2 via the light-emitting surface 22 and the first focus F1 in the immersion lens 20s) may be equalized or made different by a multiple of λ, where "λ" is the wavelength of the laser beam. FIG. 10 schematically shows, in vertical section, an example of optical head according to a third aspect of the present invention. The illustrated optical head 40 includes a slider S and a lens assembly 10 (or 10') according to the first aspect (or the second aspect) of the present invention. In operation, the slider S is caused to float over the surface of the disk D to a predetermined extent.

The optical head 40 also includes a micro actuator 41 for vertically moving the lens assembly 10 (10') relative to the slider S. In other words, the micro actuator 41 causes the lens assembly 10 to move toward and away from the optical disk D held in facing relation to the optical head 40. The micro actuator 41 may include a piezoelectric element as a component for driving the lens assembly 10.

Reference numeral 50 refers to a liquid crystal panel arranged on the side of the incidence surfaces of the lenses 20. The liquid crystal panel 50 is provided with a correcting function to correct or adjust the phase of the laser beam to be incident upon each lens 20. In the illustrated embodiment, both the micro actuator 41 and the liquid crystal panel 50 are provided. It is possible, however, to provide only one of them.

Figure 12:
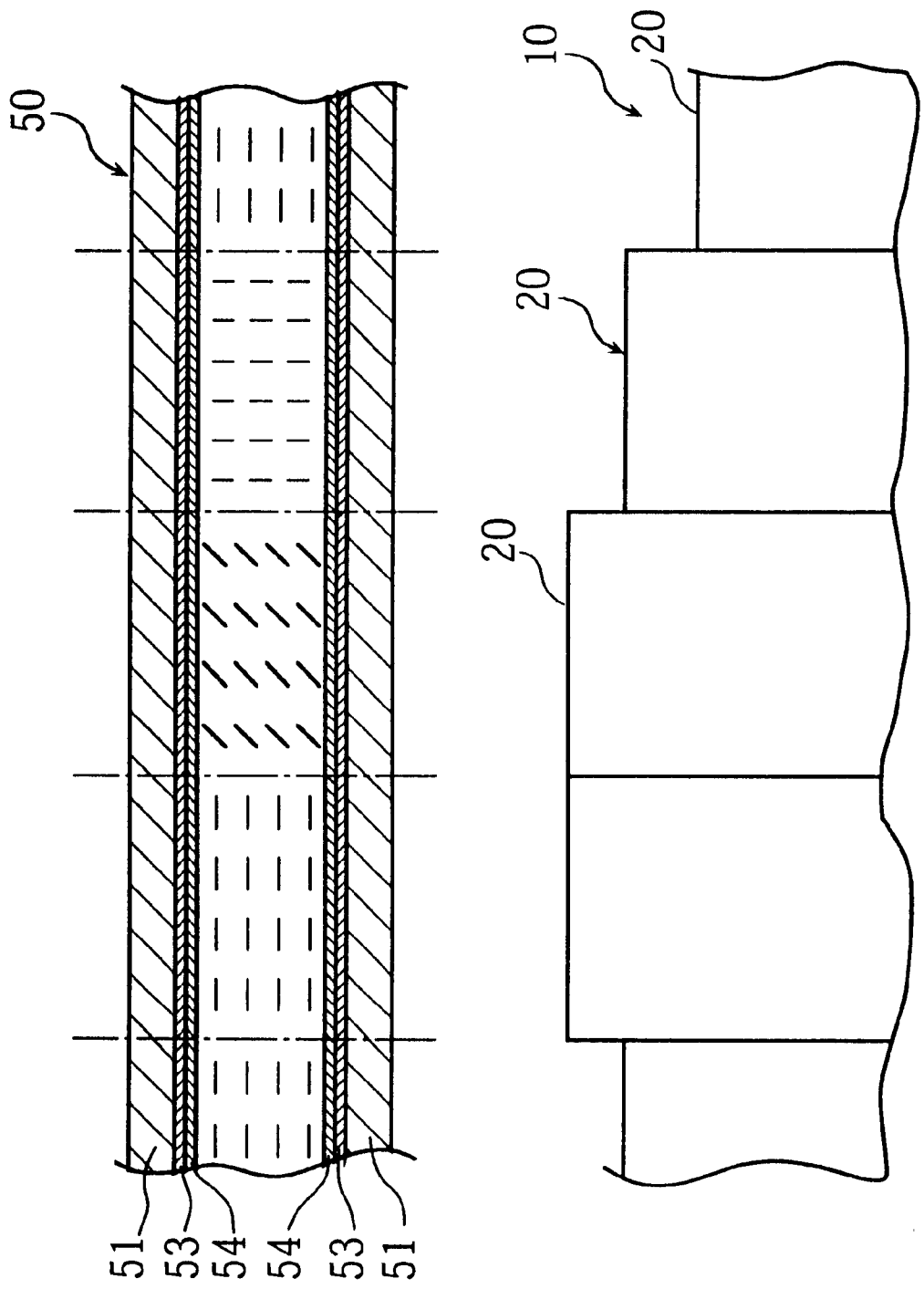
FIG. 12 illustrates the function of the liquid crystal panel shown in FIG. 11.

As shown in FIG. 12, the liquid crystal panel 50 includes two parallel transparent plates 51. The space between the plates 51 is filled with liquid crystal 52. Each transparent plate 51 is provided, on its inner surface, with a transparent electrode 53 and an orientation film 54.

Figure 11:
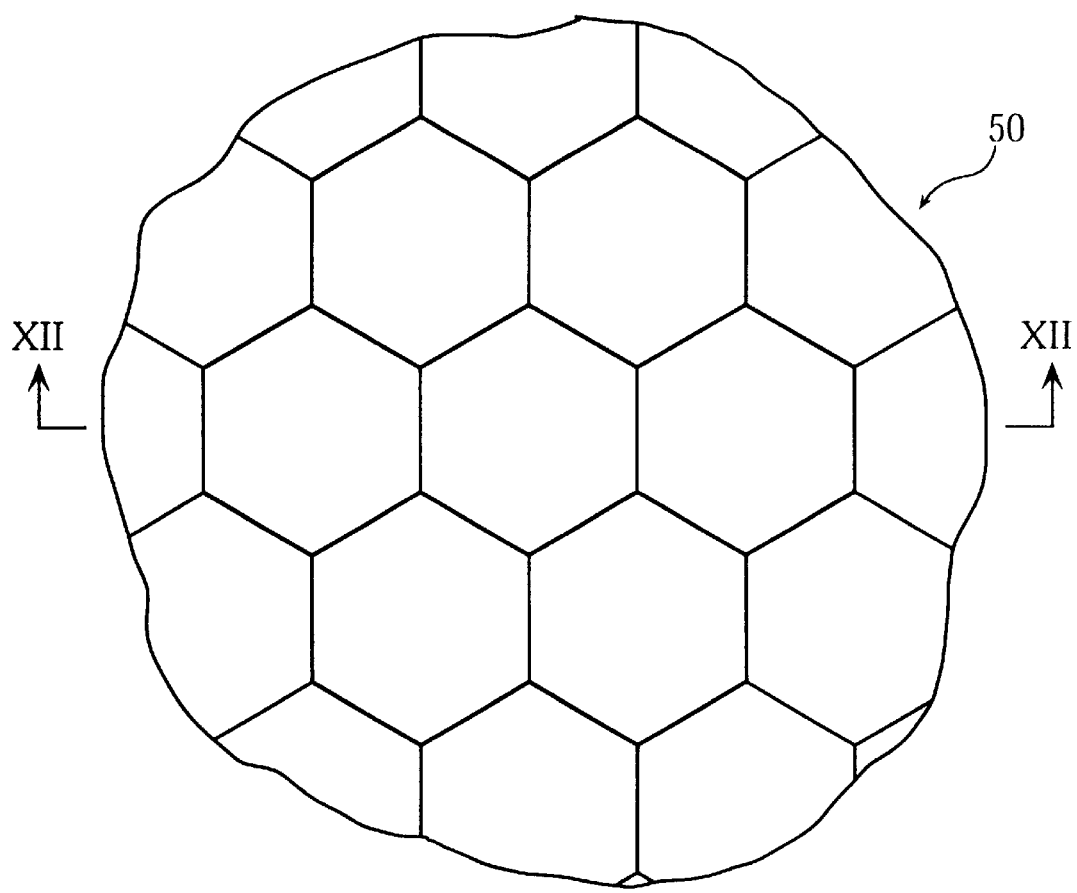
FIG. 11 a plan view showing a fragment of a liquid crystal panel used in the optical head shown in FIG. 10.

The liquid crystal panel 50 is divided into a plurality of sections corresponding to the focusing lenses 20 of the lens assembly 10 (10'), respectively (see FIG. 11). An appropriate voltage is applied independently to each of the sections via the transparent electrodes 53. Thus, by independently controlling the voltages applied to the respective sections of the liquid crystal panel 50, the orientation of liquid molecules in each section can be varied from the horizontal orientation to the vertical orientation, as shown in FIG. 12. This means that the refractive index of the liquid crystal contained in each section can be independently varied, as required.

The distance between the lens assembly 10 (10') and the optical disk can be changed by controlling the micro actuator 41. Thus, when the micro actuator is controlled based on focus error signals for example, the focus control can be automatically achieved in fast response to an improper focus condition.

Further, the liquid crystal panel 50 described above provides the optical head 40 with the following functions. Firstly, by varying the refractive indices of the respective sections of the panel 50 simultaneously in the same manner, it is possible to perform fine focus control. Secondly, by changing the refractive indices of the respective sections of the panel 50, it is possible to vary the phase of the laser beam incident upon the respective focusing lenses 20. In this manner, the position of the second focus F2 can be shifted in the recording region D2 of the disk D. This means that the track control can be performed by controlling the liquid crystal panel 50.

Figure 13:
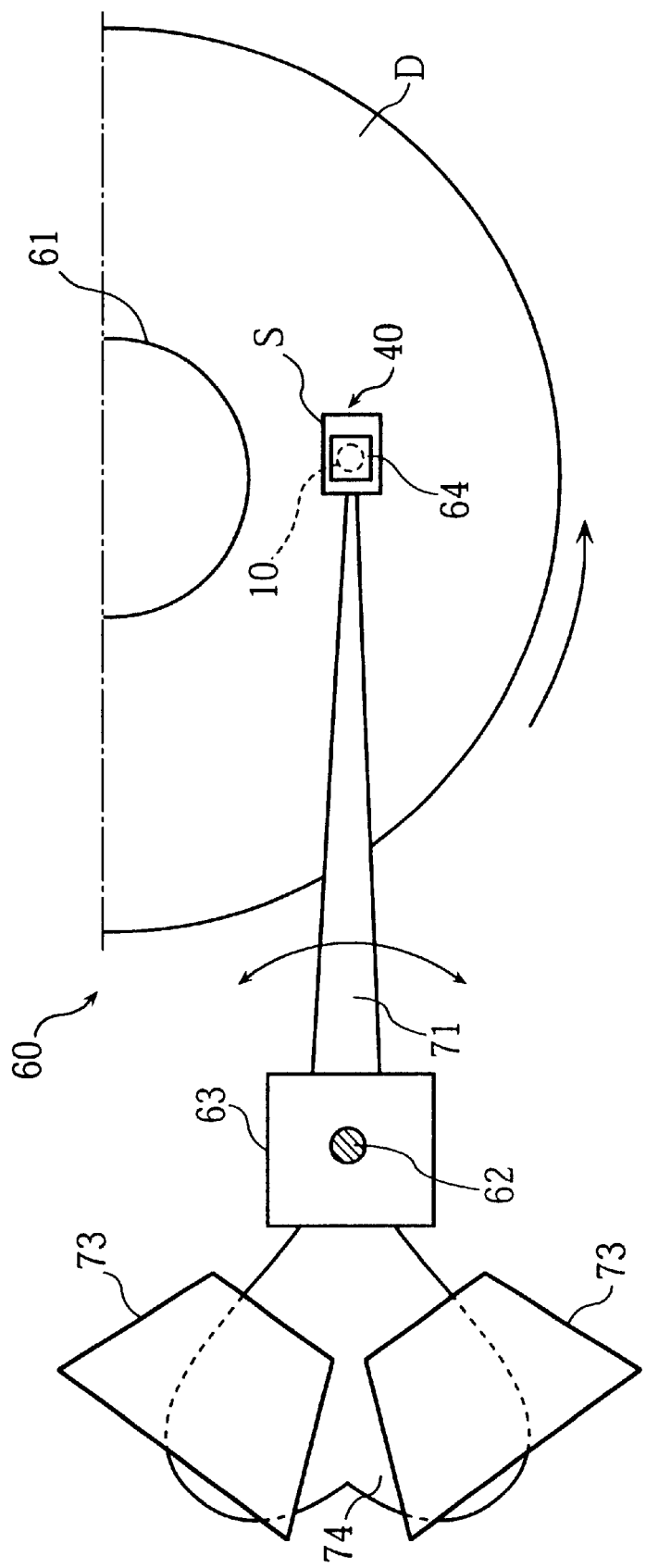
FIG. 13 is a plan view showing an arrangement of an optical disk apparatus utilizing an optical head of the present invention.
Figure 14:
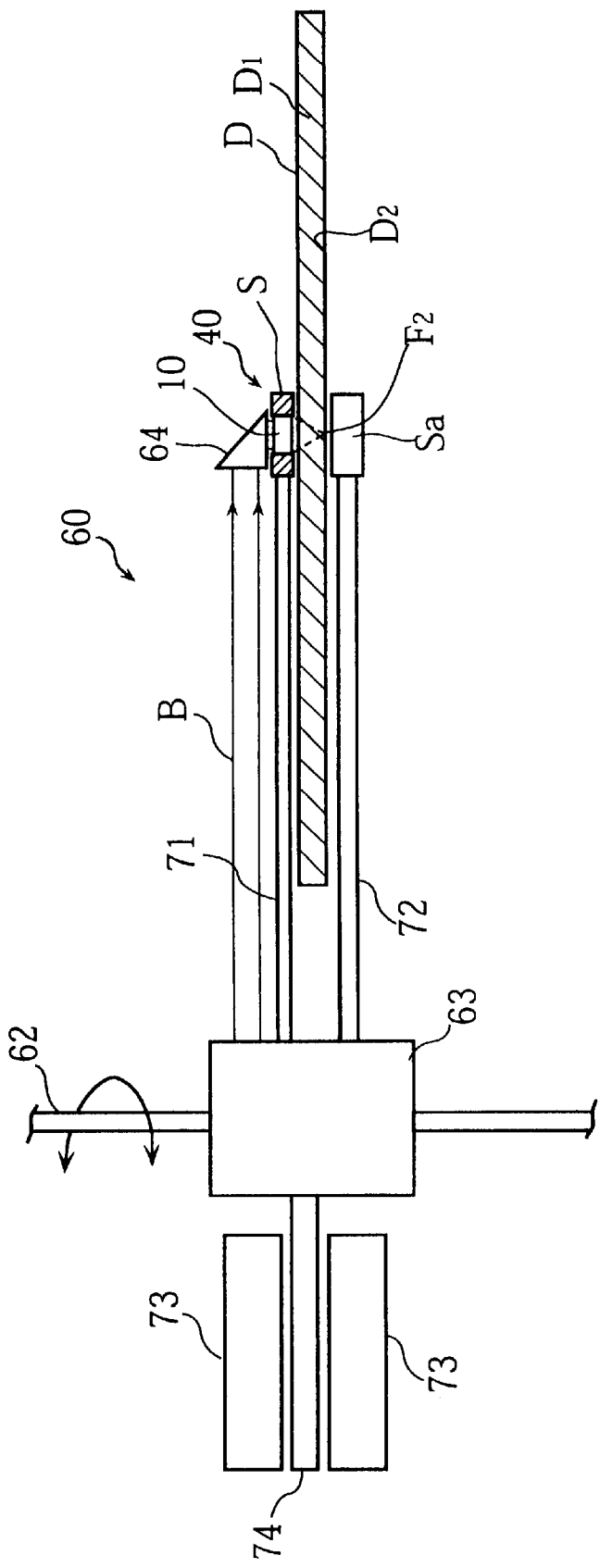
FIG. 14 is a side view showing the optical disk apparatus shown in FIG. 13.

FIGS. 13 and 14 schematically show an example of optical disk apparatus utilizing the optical head 40 described above. The illustrated optical disk apparatus 60 is provided with a data access mechanism similar to that of an conventionally available hard disk drive. An optical disk D is arranged to rotate about a vertical spindle 61, with its transparent substrate facing upward. A slider S carrying the above optical head 40 is attached to an end of a first swing arm 71. At its opposite end (called "base end" below), the first swing arm 71 is pivotably supported by a vertical shaft 62. A second swing arm 72 is also pivotable about the vertical shaft 62 and carries a slider Sa to perform data-recording by modulating the magnetic field. An optical unit 63 is fixed to the base end of the first swing arm.

As best shown in FIG. 14, a prism 64 (which may be replaced by a mirror) is mounted on the slider S for directing the laser beam B (sent out from the optical unit 63 parallel to the first swing arm 71) toward the incidence side of the lens assembly 10. The thus directed laser beam will be reflected on the disk D and then follow the same path back to the optical unit 63. For causing the first and the second swing arms 71, 72 to rotate about the vertical shaft 62, use is made of a driving mechanism including magnets 73 and a coil 74. Upon rotation of the two swing arms 71 and 72, the sliders S and Sa attached to them are moved over or under the disk D for performing a prescribed seeking operation.

As previously described with reference to FIG. 10, the slider S of the optical head 40 carries the micro actuator 41 for performing focus control and/or the liquid crystal panel 50 for performing electrical track control. In this manner, the data access mechanism of an optical disk apparatus can be made simple in arrangement and small in thickness.

Figure 15:
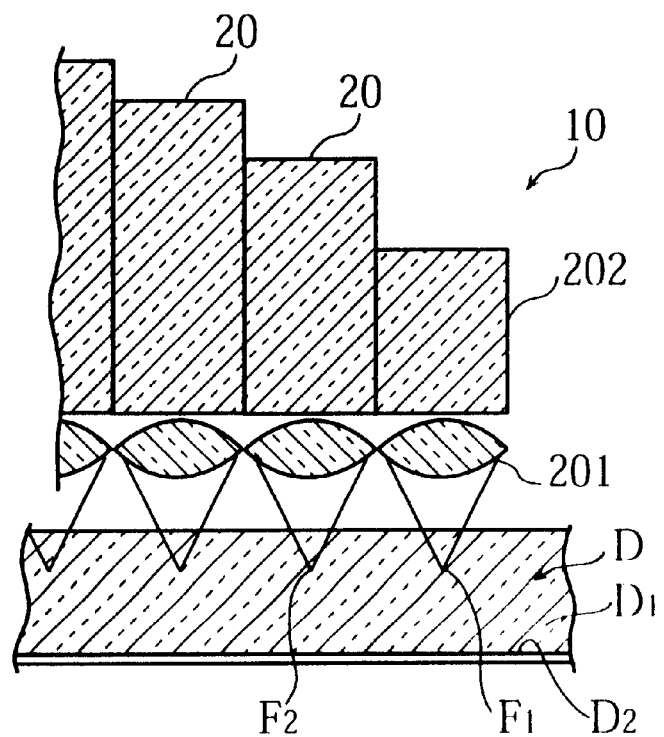
FIG. 15 is a sectional view schematically showing a different version of lens assembly according to the present invention.
Figure 16:
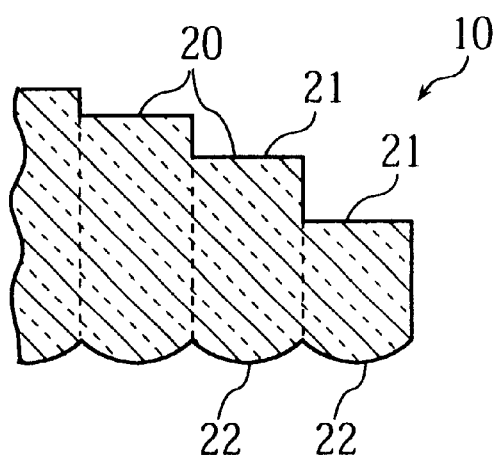
FIG. 16 is a sectional view schematically showing another version of lens assembly according to the present invention.

The present invention being thus described, it is obvious that the same may be varied in many other ways. For instance, as shown in FIG. 15, the focusing lenses 20 of a lens assembly may include convex lenses 201 and rod lenses 202 used in combination with the convex lenses. The rod lenses 202 are arranged to face the incidence surfaces of the convex lenses 201 for phase adjustment. Further, as shown in FIG. 16, the focusing lenses 20 may be integrally formed as a single unit with the use of a resin material, as long as they are functionally independent. Still further, in the illustrated embodiments, the optical disk is depicted as an example of optical recording mediums. However, the present invention is not limited to this but is applicable to other optical recording mediums such as an optical recording card. Such variations are not to be regarded as a departure from the spirit and scope of the present invention, and all such modifications as would be obvious to those skilled in the art are intended to be included within the scope of the following claims.

What is claimed is:

1. A lens assembly for causing a laser beam to form a focal spot in a recording region of an optical recording medium including a substrate, the lens assembly comprising:
   a plurality of focusing lenses each including an incidence surface for receiving the laser beam and an emitting surface for emitting the laser beam;
   wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

2. The lens assembly according to claim 1, wherein each focusing lens has a length defined between its incidence surface and its emitting surface, the length of each focusing lens being determined in correspondence to an optical length of a first light path extending from the first focus relating to said each focusing lens to the second focus.

3. The lens assembly according to claim 2, wherein a second light path extending from the incidence surface of each focusing lens to the second focus has an optical length, the optical lengths of the second light paths relating to the respective focusing lenses being made equal to each other.

4. The lens assembly according to claim 2, wherein a second light path extending from the incidence surface of each focusing lens to the second focus has an optical length, the optical lengths of the second light paths relating to the respective focusing lenses being made different from each other by a multiple of a wavelength of the laser beam, the multiple including zero.

5. The lens assembly according to claim 4, wherein each of the focusing lenses comprises a rod lens having a flat incidence surface and a convex emitting surface, diameters of the respective rod lenses being made equal to each other.

6. The lens assembly according to claim 5, wherein at least one of the focusing lenses is held in contact with four others of the focusing lenses, so that the focusing lenses are arranged in a lattice-like pattern.

7. The lens assembly according to claim 5, wherein at least one of the focusing lenses is held in contact with six others of the focusing lenses, so that the focusing lenses are arranged in a honeycomb-like pattern.

8. The lens assembly according to claim 4, wherein the focusing lenses comprise concentric ring-shaped lenses each having a flat incidence surface and a convex emitting surface.

9. A lens assembly for causing a laser beam to form a focal spot in a recording region of an optical recording medium including a transparent substrate, the lens assembly comprising:
a plurality of focusing lenses each including an incidence surface for receiving the laser beam and an emitting surface for emitting the laser beam; and
a plurality of solid immersion lenses each of which is arranged adjacent to the emitting surface of a respective one of the focusing lenses and has an emitting surface;
wherein a combination of said each solid immersion lens and the respective one of the focusing lenses is arranged so that the laser beam is caused to converge at a first focus located adjacent to an emitting surface of said each solid immersion lens, the combination being also arranged so that light sent from a near-field light at the first focus is caused to converge at a second focus located in the recording region of the optical recording medium to form the focal spot.

10. The lens assembly according to claim 9, wherein a light path extending from the incidence surface of each focusing lens to the second focus has an optical length, the optical lengths of the light paths relating to the respective focusing lenses being made different from each other by a multiple of a wavelength of the laser beam, the multiple including zero.

11. The lens assembly according to claim 9, wherein each of the focusing lenses comprises a rod lens having a flat incidence surface and a convex emitting surface, diameters of the respective rod lenses being made equal to each other.

12. An optical head comprising:
a lens assembly for causing a laser beam to form a focal spot in a recording region of an optical recording medium including a substrate, the lens assembly being provided with a plurality of focusing lenses each including an incidence surface for receiving the laser beam and an emitting surface for emitting the laser beam; and
a slider carrying the lens assembly and movable along the substrate of the optical recording medium;
wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

13. The optical head according to claim 12, further comprising an actuator mounted on the slider for moving the lens assembly toward and away from the optical recording medium.

14. The optical head according to claim 12, further comprising a liquid crystal panel arranged on a side of the incidence surfaces of the focusing lenses, the liquid crystal panel being divided into sections corresponding to the focusing lenses, respectively, each of the sections of the liquid crystal panel having a variable refractive index.

15. A lens assembly comprising:
a plurality of light-focusing rod lenses each having an incidence surface for receiving light and an emitting surface for emitting the light, the emitting surfaces of the respective rod lenses being arranged in a common plane, each of the rod lenses having a length defined between its incidence surface and emitting surface; and
a holder for holding the rod lenses together;
wherein the length of an outer rod lens is smaller than that of an inner rod lens, the rod lenses being arranged to cause light to converge at first focuses located within an optical member having a high refractive index, the rod lenses being also arranged to cause light sent from the first focuses to converge at a common second focus.

16. An optical disk apparatus comprising:
a lens assembly for causing a laser beam to form a focal spot in a recording region of an optical recording medium including a substrate, the lens assembly including a plurality of focusing lenses each of which is provided with an incidence surface for receiving the laser beam and an emitting surface for emitting the laser beam; and
a supporting member for supporting the lens assembly;
wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

17. An optical disk apparatus comprising:
a lens assembly for causing a laser beam to form a focal spot in a recording region of an optical recording medium including a substrate, the lens assembly being provided with a plurality of focusing lenses each including an incidence surface for receiving the laser beam and an emitting surface for emitting the laser beam;
a slider carrying the lens assembly and movable along the substrate of the optical recording medium; and
an actuator mounted on the slider for moving the lens assembly toward and away from the optical recording medium;
wherein each focusing lens is arranged so that the emitted laser beam is caused to converge at a first focus located in contact with the substrate of the optical recording medium, while also being arranged so that light sent from the first focus is caused to converge at a second focus located in the recording region of the optical recording medium to form the focal spot.

* * * * *